(12) United States Patent
Allen

(10) Patent No.: US 7,205,691 B2
(45) Date of Patent: Apr. 17, 2007

(54) ALTERNATOR SUB-COMPONENT CONSTRUCTION BUILT INSIDE EXISTING AUTOMOTIVE GENERATOR HOUSING

(76) Inventor: Donald James Allen, 85340 Highway 101 South, Florence, OR (US) 97439

( * ) Notice: Subject to any disclaimer, the term of this patent is extended or adjusted under 35 U.S.C. 154(b) by 282 days.

(21) Appl. No.: 11/050,297

(22) Filed: Feb. 2, 2005

(65) Prior Publication Data

US 2006/0170295 A1    Aug. 3, 2006

(51) Int. Cl.
*H02K 5/04* (2006.01)
*H02K 15/14* (2006.01)

(52) U.S. Cl. .............. 310/89; 310/68 D; 310/217; 29/596

(58) Field of Classification Search ............ 310/217, 310/89, 68 D
See application file for complete search history.

(56) References Cited

U.S. PATENT DOCUMENTS

| | | | |
|---|---|---|---|
| 4,360,749 A | 11/1982 | Neumann et al. | 360/42 |
| 4,716,648 A | 1/1988 | Nel | 29/596 |
| 2004/0090133 A1 | 5/2004 | Yockey et al. | 310/89 |
| 2006/0170295 A1 | 8/2006 | Allen | 310/89 |

OTHER PUBLICATIONS

Jim Morton, "Upgrading to Alternators", British Motoring, vol. 21, No. 4, winter 2003-2004, pp. 18-19.
"Alternator in Generator Disguise", Swissmike, JalopyJournal.com, Sep. 21, 2004.
"Generator to Alternator Conversion for the 12volt Type III", Toby Erkson, Dec. 2003, wwww.icbm.org/erkson/ttt/engine/gen2alt.htm.

*Primary Examiner*—Karl Tamai
(74) *Attorney, Agent, or Firm*—Donald W. Meeker

(57) ABSTRACT

An alternator sub-component construction is built inside an original antique generator housing or a replica housing, thereby having the appearance of an original generator but functioning with modern and improved alternator capabilities.

4 Claims, 2 Drawing Sheets

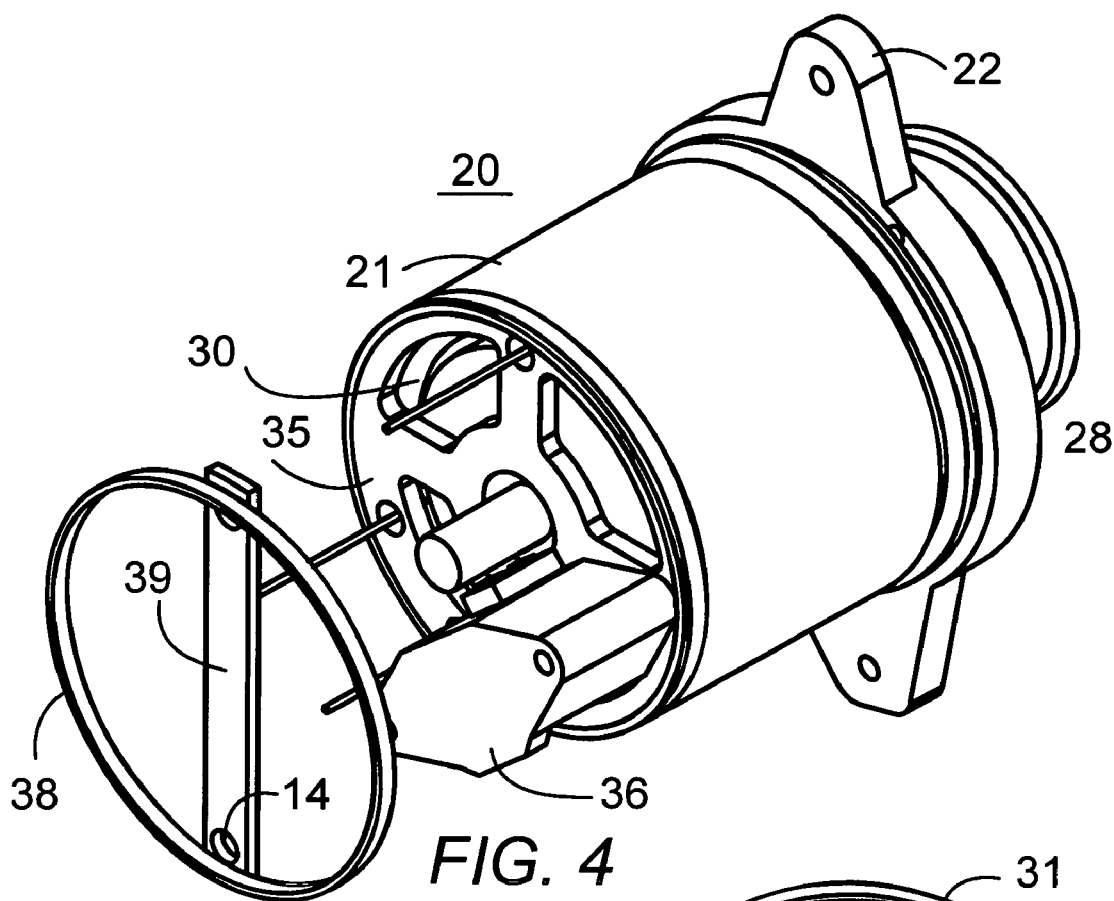
FIG. 4
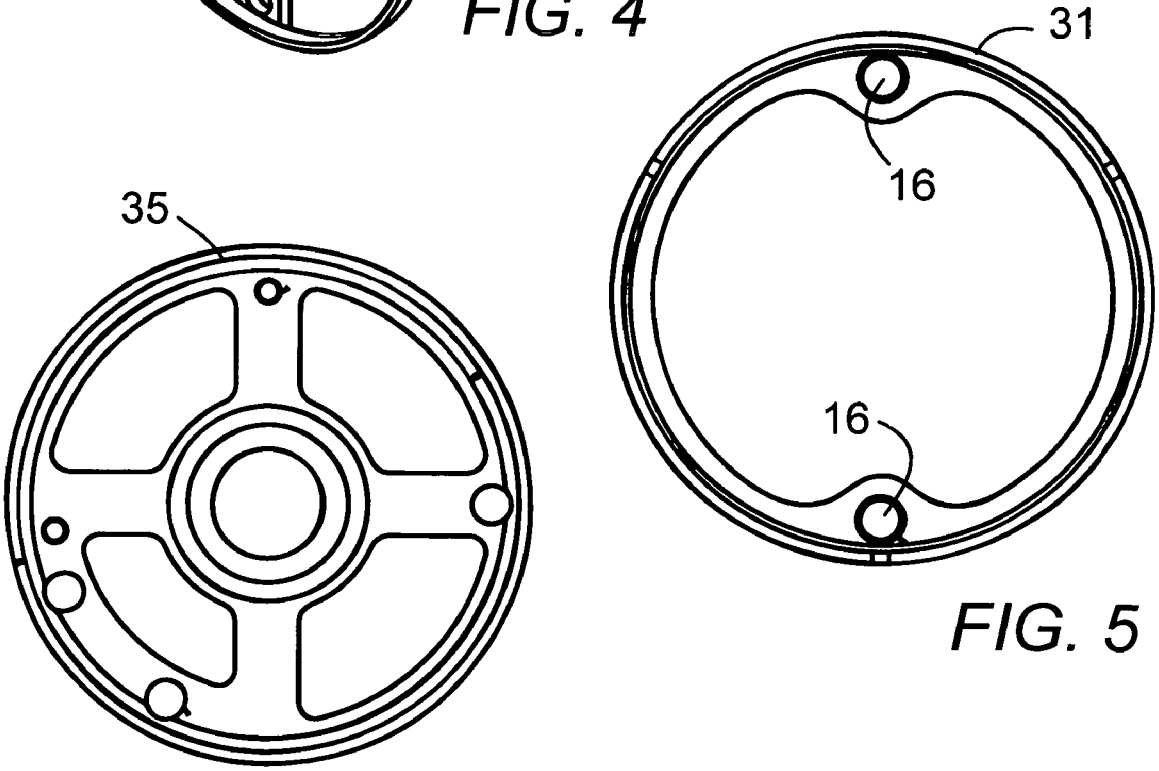
FIG. 5
FIG. 6

ALTERNATOR SUB-COMPONENT CONSTRUCTION BUILT INSIDE EXISTING AUTOMOTIVE GENERATOR HOUSING

BACKGROUND OF THE INVENTION

1. Field of the Invention

The present invention relates to antique car restoration and particularly to an alternator sub-component construction built inside an original antique generator housing or a replica housing, thereby having the appearance of an original generator but functioning with modern and improved alternator capabilities.

2. Description of the Prior Art

A generator can only put out it's maximum rated current at or above some speed. At lower speeds the output drops off very quickly. This is why a generator-equipped car will not charge or even maintain the battery at idle and this is one of the main reasons for the development of the alternator.

The generator and external voltage regulator have increasing failure rates when saddled with the demands of more modern automotive electrical applications. Many street rodders and purists look for more power from the generating system, without having to mount an alternator and take away that nostalgic look.

Every modern vehicle uses an alternator, and for good reasons. It is more complicated than a generator, but that added complexity brings a few very good features: it will charge the battery at idle and can support the higher amperages needed to run all of the electrical equipment on a modern vehicle. Alternators tend to be more reliable than a generator and have fewer hard to diagnose problems as the system ages, particularly the internally regulated models. The internally regulated models are also very easy to service if something goes wrong since there is only one part to fail (the alternator itself) and replacing it is a fairly straight forward job. This all adds up to the performance and reliability that is expected in a modern vehicle.

The key difference between an alternator and a generator is what spins and what is fixed. On a generator windings of wire (the armature) spin inside a fixed magnetic field. On an alternator, a magnetic field is spun inside of windings of wire called a stator to generate the electricity. This allows the wires to be directly and easily connected to their outputs without the need for sliding contacts to carry the relatively high output current. The magnetic field is still generated via electro magnets mounted on a rotor, and the relatively small field current that powers them is supplied to the rotor by two small brushes that each ride on a separate and continuous slip rings. The fact that the alternator has smooth slip rings, unlike the comparatively rough contacts on a commutator in a generator, and the fact that the relatively heavy windings are fixed instead of rotating allows the alternator to be spun to much higher speeds. This allows it to reach it's maximum output sooner and to be spun fast enough at engine idle speeds to produce enough electricity to power most of the needs of the car without relying on the battery.

The process of rectifying the AC current into DC current is handled inside the alternator by something more complex than a commutator—diodes. A diode is a "solid state" device that allows current to flow in one direction only without any moving parts. It relies on the different electrical properties of the materials it is made of to act as a one-way valve for current. By arranging diodes so that current from each of the three stator wires is only allowed to pass in one direction, and by connecting the three outputs together, you get a very smooth and stable DC output without any moving parts. This arrangement is typically manufactured as a single part and is referred to as the diode pack or rectifier. This lack of moving parts makes the alternator not only very reliable—but also comparatively inexpensive to build and repair.

Alternators do not need to be polarized after installation as generators do. You mount them to the engine, plug them in, and go. This is an advantage for not only manufacturing the car but for servicing it as well.

In competition, restored vehicles must retain the original look of the vehicle including all of the components under the hood.

Therefore it would be desirable to provide an alternator for vehicles originally equipped with generators, wherein the alternator components could be adapted into a system which fits inside an original equipment generator housing or accurately detailed reproduction generator housing.

SUMMARY OF THE INVENTION

An object of the present invention is to provide an alternator for vehicles originally equipped with generators, wherein an alternator sub-component is built inside an original equipment generator housing or accurately detailed reproduction generator housing thereby providing the advantages of an alternator in a vintage vehicle while maintaining an original equipment look required for competitions.

Another object of the present invention is to provide an alternator constructed in a vintage generator housing which outputs two to three times that of original charging systems and enables the addition of accessories such as stereo, lights, fans, etc, and maintains a steady and constant volt level and capable of meeting the high demands of today's electrical components so you don't get the dreaded dim headlights at idle as you do with conventional generators.

An additional object of the present invention is to provide a built-in electronic voltage regulator as part of the alternator sub-component constructed within the vintage generator housing to eliminate the problems associated with original equipment type coil operated external voltage regulators.

In brief, all internal components are removed from a vintage vehicle generator housing and replaced with an alternator sub-component built into the vintage generator housing precision constructed with new machined parts plus new alternator components of which work effectively within the vintage generator housing. All original equipment external parts may be used for final assembly and the alternator sub-component fabricated in the original or a reproduction vintage generator housing can be mounted on existing original equipment brackets.

By using existing original equipment wiring attached according to the system of the present invention, the alternator system in the generator housing of the present invention will look like an original equipment generator but function like a modern alternator and have twice the operational capabilities of the original equipment generator. The generator to alternator conversion system of the present invention may be used on many different types of automotive generators.

An advantage of the present invention is that it provides an alternator for vehicles originally equipped with generators.

Other advantages of the present invention are that it outputs two to three times that of original charging systems and enables the addition of accessories and maintains a steady and constant volt level so that it is capable of meeting the high demands of today's electrical components.

An additional advantage of the present invention is that it provides a built-in electronic voltage regulator to eliminate the problems associated with original equipment type coil operated external voltage regulators.

BRIEF DESCRIPTION OF THE DRAWINGS

These and other details of my invention will be described in connection with the accompanying drawings, which are furnished only by way of illustration and not in limitation of the invention, and in which drawings:

FIG. 4 is a partially broken perspective view of the vintage generator housing of the invention partially broken away to reveal some of the components of the alternator sub-component construction inside the housing;

FIG. 5 is a front elevational view of the stator ring of the present invention;

FIG. 6 is a front elevational view of the rotor alignment plate of the present invention.

BEST MODE FOR CARRYING OUT THE INVENTION

Figure 1:
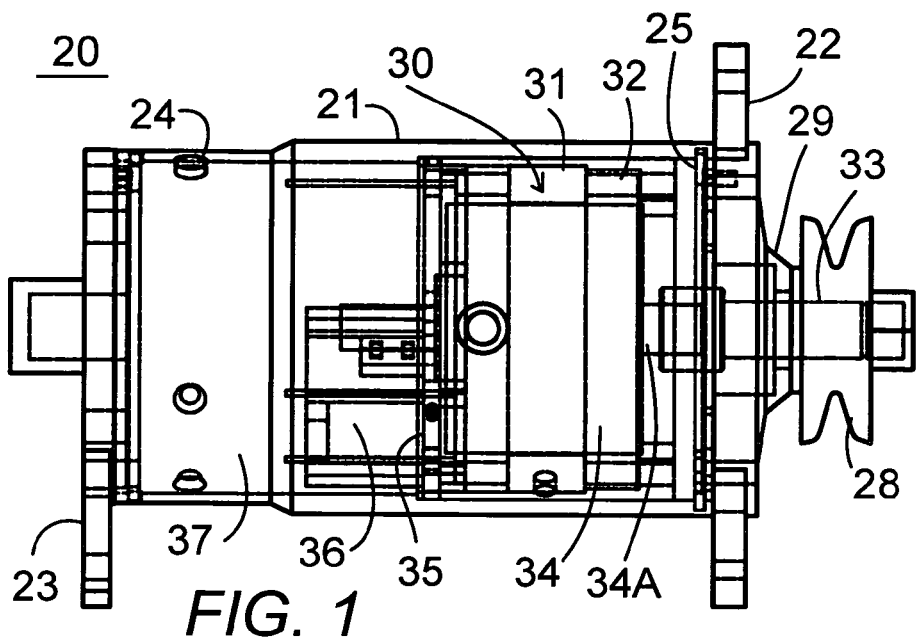
FIG. 1 is a cross-sectional view taken through the center of the vintage generator housing showing the parts of the alternator sub-component construction inside the housing.
Figure 2:
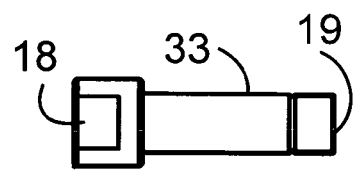
FIG. 2 is a side elevational view of the rotor shaft adapter of the present invention.

In FIGS. 1–6, an alternator sub-component construction 30 is built into a vintage generator housing 21 to form a hybrid alternator in a generator device 20.

A vintage generator housing 21 has all internal generator parts removed and is bored out to a larger internal diameter at least along a portion of the vintage generator housing to accommodate a new alternator sub-component 30 and a drive end notch cut in the drive end of the vintage generator housing to accommodate a snap ring 25 to retain an end of the new alternator sub-component 30.

A drive end of the vintage generator housing 21 is fitted with an original equipment bracket 22 and fan belt pulley 28 and bearing mount 29 and a commutator end fitted with an original equipment bracket 23 and wire terminals 24., the drive end having an original equipment fan belt pulley rotatably attachable at the drive end and attachable to an original equipment fan belt and the commutator end having external terminal connections with wiring connectable to original equipment parts of the vintage vehicle, so that the vintage generator unit maintains a mounted and connected appearance of an original equipment generator in an engine compartment of the vintage vehicle;

In FIGS. 1 and 4, an alternator sub-component 30 is built into the vintage generator housing 21. The alternator sub-component 30 comprises a rotor 34 with slip rings rotatable within a stator 32 in a stator shell 31 (with a clearance between the rotor and the stator having a very close tolerance for maximum output efficiency), a rectifier 37 wired to the stator, a built-in voltage regulator 36 with a brush pack mounted to the rotor alignment plate 35 perpendicular to the rotor slip rings and wired to the rectifier 37 and a vintage generator housing wire terminal 24, and new machined parts comprising a rotor shaft adaptor 33 attached between a rotor shaft 34A and the fan belt pulley 28 so that the vehicle fan belt turns the fan belt pulley 28, which turns the rotor shaft 34A and rotor 34 within the stator to generate electricity, a stator shell 31 secured to the stator 32, the stator shell bolted to the drive end bracket 22, a rotor alignment plate 35 attached to the rotor 34 and the stator shell 31, the alternator sub-component 30 built into the vintage generator housing 21 so that when fully assembled it takes on the appearance of a vintage generator, while being a fully operational alternator and the device comprises a fully operational hybrid alternator 20 fit in such a way to be of precise tolerances and concentrically assembled to allow a smooth and reliable charging performance at any RPM.

In FIGS. 1 and 5, the custom stator shell 31 which is heated to 400 degrees F. and the stator 32 is inserted into the hot stator shell. Upon cooling the stator shell 31 shrinks to secure the stator 32 therein with a perfect heat shrink fit, the stator shell 31 having an outer diameter to fit within the bored interior portion of the vintage generator housing 21.

The rotor 34 comprises a nippondenso type rotor reconfigured with drive-end fan blades removed, a rotor shaft 34A at a drive-end of the rotor, the rotor shaft having a portion cut off, and slip rings (not shown) at a commutator end of the rotor, a rotor shaft adapter 33 pressed onto the rotor shaft and secured by a pin.

The rotor 34 is fit with a close tolerance fit rotatably within the stator 32 and the rotor alignment plate 35 (FIGS. 1, 4 and 6) is secured to the stator shell 31 in a stationary position by three pins through three mating holes through the stator shell and the rotor alignment plate. The rotor shaft adapter 33 distal end 19 is attachable to the original fan belt pulley 28 with the proximal end 18 attached to the rotor shaft 34A so that the rotor turns with the fan belt pulley 28.

In FIGS. 1 and 4, a voltage regulator 36 is attached to the rotor alignment plate 35 on a commutator side of the rotor alignment plate, the voltage regulator 36 having a brush pack mounted perpendicular to the rotor slip rings. Three phase wires are attached between the stator 32 and a rectifier 37. The rectifier 37 is mounted within the commutator end of the vintage generator housing, the rectifier having phase terminals, and the stator phase wires extending through the rotor alignment plate 35 and attached to the phase terminals of the rectifier 37. The voltage regulator brush pack is wired to the rectifier and as access terminal using an original equipment terminal hole 24 in the vintage generator housing 21. An output circuit is connected from the rectifier 37 to another original equipment terminal hole 24 in the vintage generator housing 21.

In FIG. 4, a flat bar 39 is secured within slots 15 (FIG. 3) cut into the vintage generator housing 21 at the commutator end, the flat bar having threaded holes 14. Bolts through the original equipment commutator end frame 23 are threaded into the flat bar 39 to secure the original equipment commutator end frame 23 to the flat bar. A commutator end alignment ring 38 may be necessary for some vintage generator housing replicas.

An original equipment drive end bearing and bearing frame 29, bearing retainer, and the drive end external bracket 22 are secured by two bolts into threaded holes 16 in the stator shell 31 (FIG. 5) and the alternator sub-assembly is secured up against an internal snap ring 25 (FIG. 1) in the drive end notch and centered by a new drive end alignment ring to provide a fully operational alternator that is built into the vintage generator housing in such a way to be of precise tolerances and assembled in a truly concentric method to allow a smooth and reliable charging performance at any RPM.

Figure 3:
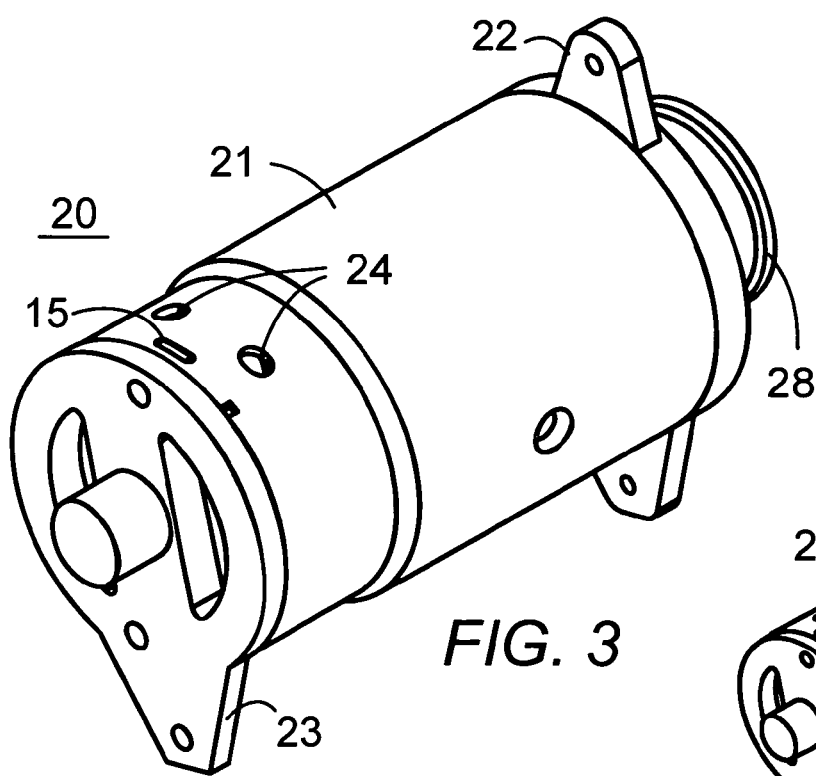
FIG. 3 is a perspective view of the vintage generator unit as a whole.
Figure 3A:
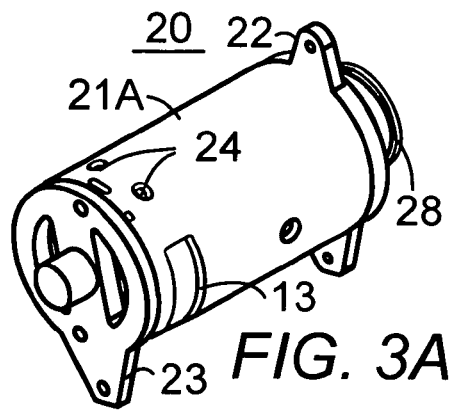
FIG. 3A is a perspective view in reduced scale of an alternate vintage generator housing with cut-outs.

The alternator sub-component can be fabricated in a wide variety of vintage generators including those vintage generator housings 21A with cut-outs 13, as shown in FIG. 3A.

It is understood that the preceding description is given merely by way of illustration and not in limitation of the invention and that various modifications may be made thereto without departing from the spirit of the invention as claimed.

What is claimed is:

1. An alternator sub-component construction built into a vintage generator housing to form a hybrid alternator in generator housing device, the device comprising:

a vintage generator housing having all internal generator parts removed, the vintage generator housing bored out to a larger internal diameter, the vintage generator having a drive end fitted with an original equipment bracket and fan belt pulley and bearing mount and a commutator end fitted with an original equipment bracket and wire terminals;

an alternator sub-component built into the vintage generator housing, the alternator sub-component comprising a rotor with slip rings within a stator, a rectifier wired to the stator, a built-in voltage regulator with a brush pack mounted to the rotor alignment plate perpendicular to the rotor slip rings and wired to the rectifier and a vintage generator housing wire terminal, and new machined parts comprising a rotor shaft adaptor attached between a rotor shaft and the fan belt pulley, a stator shell secured to the stator, the stator shell bolted to the drive end bracket, a rotor alignment plate attached to the rotor and the stator shell so that the alternator sub-component built into the vintage generator so that when fully assembled it takes on the appearance of a vintage generator, while being a fully operational alternator and the device comprises a fully operational hybrid alternator fit in such a way to be of precise tolerances and concentrically assembled to allow a smooth and reliable charging performance at any RPM.

2. The device of claim 1 wherein the stator comprises a stator fit with a tight precision non-rotational fit within a custom stator shell which is heated and shrunk to secure the stator therein, the stator shell having an outer diameter to fit within the bored interior portion of the vintage generator housing.

3. The device of claim 1 wherein the rotor comprises a nippondenso type rotor reconfigured with drive-end fan blades removed, a rotor shaft at a drive-end of the rotor, the rotor shaft having a portion cut off, and slip rings at a commutator end of the rotor, a rotor shaft adapter pressed onto the rotor shaft and secured by a pin.

4. An alternator sub-component construction built into a vintage generator housing to form a hybrid alternator in generator housing device, the device comprising:

a vintage generator housing exclusive of original interior components, the vintage generator housing having a drive end and a commutator end with an original equipment external bracket at each end mountable to original equipment mounting brackets on a vintage vehicle, the vintage generator housing having at least a portion of an interior of the vintage generator housing bored out to accommodate a new alternator sub-component and a drive end notch cut in the drive end of the vintage generator housing, the drive end having an original equipment fan belt pulley rotatably attachable at the drive end and attachable to an original equipment fan belt and the commutator end having external terminal connections with wiring connectable to original equipment parts of the vintage vehicle, so that the vintage generator housing maintains a mounted and connected appearance of an original equipment generator in an engine compartment of the vintage vehicle;

an alternator sub-component built into the vintage generator housing, the alternator sub-component comprising a stator fit with a tight precision non-rotational fit within a custom stator shell having an outer diameter to fit within a bored interior portion of the vintage generator housing, a nippondenso type rotor reconfigured with drive-end fan blades removed, a rotor shaft at a drive-end of the rotor, the rotor shaft having a portion cut off, and slip rings at a commutator end of the rotor, a rotor shaft adapter pressed onto the rotor shaft and secured by a pin, a rotor alignment plate press fit onto the commutator end of the rotor, the rotor fit rotatably within the stator and the rotor alignment plate secured to the stator shell a stationary position by three pins through three mating holes through the stator shell and the rotor alignment plate, the rotor shaft adapter attachable to the original fan belt pulley so that the rotor turns with the fan belt pulley, a voltage regulator attached to the rotor alignment plate on a commutator side of the rotor alignment plate, the voltage regulator having a brush pack mounted perpendicular to the rotor slip rings, a rectifier mounted within the commutator end of the vintage generator housing, the rectifier having phase terminals, three stator phase wires extending through the rotor alignment plate and attached to the phase terminals of the rectifier, the voltage regulator brush pack wired to the rectifier and as access terminal using an original equipment terminal hole in the vintage generator housing, an output circuit connected from the rectifier to another original equipment terminal hole in the vintage generator housing, a flat bar secured within slots cut into the vintage generator housing at the commutator end, the flat bar having threaded holes, bolts through the original equipment communtator end frame are threaded into the flat bar to secure the original equipment commutator end frame to the flat bar and an original equipment drive end bearing and bearing, bearing retainer, and the drive end external bracket are secured by two bolts into threaded holes in the stator shell and the alternator sub-assembly is secured up against an internal snap ring in the drive end notch and centered by a new drive end alignment ring to provide a fully operational alternator that is built into the vintage generator housing in such a way to be of precise tolerances and assembled in a truly concentric method to allow a smooth and reliable charging performance at any RPM.

* * * * *